United States Patent
Habibian et al.

(10) Patent No.: US 11,308,350 B2
(45) Date of Patent: Apr. 19, 2022

(54) DEEP CROSS-CORRELATION LEARNING FOR OBJECT TRACKING

(71) Applicant: QUALCOMM Incorporated, San Diego, CA (US)

(72) Inventors: Amirhossein Habibian, Amsterdam (NL); Cornelis Gerardus Maria Snoek, Volendam (NL)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 15/708,014

(22) Filed: Sep. 18, 2017

(65) Prior Publication Data
US 2018/0129906 A1    May 10, 2018

Related U.S. Application Data

(60) Provisional application No. 62/418,707, filed on Nov. 7, 2016.

(51) Int. Cl.
*G06K 9/62* (2022.01)
*G06N 3/067* (2006.01)
(Continued)

(52) U.S. Cl.
CPC .......... *G06K 9/623* (2013.01); *G06K 9/6273* (2013.01); *G06N 3/0454* (2013.01); *G06N 3/067* (2013.01);
(Continued)

(58) Field of Classification Search
CPC .... G06K 9/623; G06K 9/6273; G06K 9/4628; G06K 2009/3291; G06N 3/0454; G06N 3/084; G06N 3/067
See application file for complete search history.

(56) References Cited

U.S. PATENT DOCUMENTS 8,494,222 B2    7/2013    Cobb et al.
8,873,798 B2    10/2014   Tsagkatakis et al.
(Continued)

FOREIGN PATENT DOCUMENTS

WO    2016175923 A1    11/2016

OTHER PUBLICATIONS

Bertinetto L., et al., "Fully-Convolutional Siamese Networks for Object Tracking," European Conference on Computer Vision, arXiv:1606.09549v2 [cs.CV] Sep. 14, 2016, pp. 1-16.
(Continued)

*Primary Examiner* — John W Lee
(74) *Attorney, Agent, or Firm* — Seyfarth Shaw LLP

(57) ABSTRACT

An artificial neural network for learning to track a target across a sequence of frames includes a representation network configured to extract a target region representation from a first frame and a search region representation from a subsequent frame. The artificial neural network also includes a cross-correlation layer configured to convolve the extracted target region representation with the extracted search region representation to determine a cross-correlation map. The artificial neural network further includes a loss layer configured to compare the cross-correlation map with a ground truth cross-correlation map to determine a loss value and to back propagate the loss value into the artificial neural network to update filter weights of the artificial neural network.

20 Claims, 10 Drawing Sheets

(51) Int. Cl.
G06N 3/08 (2006.01)
G06V 10/82 (2022.01)
G06N 3/04 (2006.01)
G06V 10/20 (2022.01)
G06V 10/44 (2022.01)
G06V 10/62 (2022.01)

(52) U.S. Cl.
CPC ........... *G06N 3/084* (2013.01); *G06V 10/255* (2022.01); *G06V 10/454* (2022.01); *G06V 10/62* (2022.01)

(56) References Cited

U.S. PATENT DOCUMENTS

| | | | |
|---|---|---|---|
| 9,052,386 B2 | 6/2015 | Yeredor et al. | |
| 9,269,012 B2 | 2/2016 | Fotland | |
| 9,373,057 B1 | 6/2016 | Erhan et al. | |
| 9,830,709 B2* | 11/2017 | Li | G06V 40/20 |
| 10,013,640 B1* | 7/2018 | Angelova | G06K 9/6271 |
| 2005/0031166 A1* | 2/2005 | Fujimura | G06V 40/107 382/103 |
| 2016/0148080 A1* | 5/2016 | Yoo | G06N 3/0454 382/118 |
| 2016/0163035 A1* | 6/2016 | Chang | G06N 3/0454 382/149 |
| 2016/0171346 A1* | 6/2016 | Han | G06V 20/00 382/156 |
| 2016/0189009 A1* | 6/2016 | Tran | G06N 3/0454 382/158 |
| 2017/0083792 A1* | 3/2017 | Rodriguez-Serrano | G06T 7/74 |
| 2017/0294010 A1* | 10/2017 | Shen | G06N 3/08 |
| 2018/0025249 A1* | 1/2018 | Liu | G06V 10/82 382/158 |
| 2018/0075290 A1* | 3/2018 | Chen | G06V 40/171 |

OTHER PUBLICATIONS

Briechle K., et al., "Template matching using fast normalized cross correlation," Proceeding of SPIE 4387, Optical Pattern Recognition XII, 2001, pp. 1-8.

Chopra S., et al., "Learning a Similarity Metric Discriminatively, with Application to Face Verification," IEEE Computer Society Conference on Computer Vision and Pattern Recognition, 2005, 8 pages.

Comaniciu D., et al., "Real-Time Tracking of Non-Rigid Objects using Mean Shift," Proceedings IEEE Conference on Computer Vision and Pattern Recognition, 2000, 8 pages.

Danelljan M., et al., "Accurate Scale Estimation for Robust Visual Tracking," Proceedings of the British Machine Vision Conference, 2014, pp. 1-11.

Gan Q., et al., "First Step toward Model-Free, Anonymous Object Tracking with Recurrent Neural Networks," Computer Vision and Pattern Recognition, arXiv:1511.06425v2 [cs.CV], Nov. 25, 2015, pp. 1-13.

Hare S., et al., "Struck: Structured Output Tracking with Kernels," International Conference on Computer Vision (ICCV), 2011, pp. 1-14.

Held D., et al., "Learning to Track at 100 FPS with Deep Regression Networks," Computer Vision and Pattern Recognition, arXiv:1604.01802v2 [cs.CV] Aug. 16, 2016, pp. 1-26.

Henriques J.F., et al., "High-Speed Tracking with Kernelized Correlation Filters," IEEE Transactions on Pattern Analysis and Machine Intelligence, arXiv:1404.7584v3 [cs.CV] 2014, pp. 1-14.

Kahou S.E., et al., "RATM: Recurrent Attentive Tracking Model", Apr. 28, 2016, 10 pages, XP055368332, Retrieved from the Internet: URL: https://arxiv.org/pdf/1510.08660v3.pdf [retrieved on Apr. 28, 2016].

Kwon J., et al., "Tracking by Sampling Trackers," International Conference on Computer Vision, 2011, pp. 1195-1202.

Ma C., et al., "Hierarchical Convolutional Features for Visual Tracking," IEEE International Conference on Computer Vision (ICCV), 2015, pp. 3074-3082.

Nam H., et al., "Learning Multi-Domain Convolutional Neural Networks for Visual Tracking," Computer Vision and Pattern Recognition, 2016, pp. 4293-4302.

Tao R., et al., "Siamese Instance Search for Tracking," Computer Vision and Pattern Recognition, 2016, pp. 1420-1429.

Wang L., et al., "STCT: Sequentially Training Convolutional Networks for Visual Tracking," Computer Vision and Pattern Recognition, 2016, pp. 1373-1381.

International Search Report and Written Opinion—PCT/US2017/052252—ISA/EPO—dated Dec. 19, 2017.

* cited by examiner

DEEP CROSS-CORRELATION LEARNING FOR OBJECT TRACKING

CROSS-REFERENCE TO RELATED APPLICATION

The present application claims the benefit of U.S. Provisional Patent Application No. 62/418,707, filed on Nov. 7, 2016, and titled "DEEP CROSS-CORRELATION LEARNING FOR OBJECT TRACKING," the disclosure of which is expressly incorporated by reference herein in its entirety.

BACKGROUND

Field

Certain aspects of the present disclosure generally relate to machine learning and, more particularly, to improving systems and methods for tracking objects in sequential data using an artificial neural network.

Background

An artificial neural network, which may comprise an interconnected group of artificial neurons (e.g., neuron models), is a computational device or represents a method to be performed by a computational device.

An artificial neural network (ANN) may be specified to track an object in a sequence of frames, such as a video. That is, given an object's bounding box in a first frame, it is desirable to predict the location of the object over time (e.g., over consecutive frames). Object tracking may be used for various applications in internet protocol (IP) cameras, Internet of Things (IoT), autonomous driving, and/or service robots. The object tracking applications may include improved object perception and/or understanding of object paths for planning.

For object tracking, the artificial neural network may be trained to track the object from a first frame to a search region of a subsequent frame using various techniques. That is, the artificial neural network may match an image, such as an image in a bounding box, from a first frame to a search region of a second frame (e.g., subsequent frame).

Still, the conventional training techniques may not be tailored for object tracking or may be slow. For example, a conventional object tracking system may rely on extracting hand-crafted features to track an object from a first frame to a search region of a subsequent frame. Still, hand-crafted features may not properly describe and/or discriminate objects in the frames.

Other conventional object tracking systems apply features of an off-the-shelf network. The off-the-shelf network may have been trained for object classification. Therefore, the off-the-shelf network, trained for object (e.g., image) classification, may be too abstract or too specific for proper object tracking.

In another conventional system, a network may be trained online for object tracking. That is, a convolutional neural network may be trained online to classify (e.g., discriminate) proposal regions as either a target or a background. The training (e.g., fine-tuning) of a convolutional neural network may be slow. Thus, the online training may not be applicable for real-time tracking.

Additionally, in some conventional systems, a convolutional neural network is trained offline on a set of videos and the corresponding ground truth object bounding boxes. Specifically, the convolutional neural network is trained to learn a binary classification function to determine whether an object is a target or a background. However, the binary classification function may result in inconsistencies and/or inaccuracies for the binary label (e.g., target or background).

Aspects of the present disclosure are directed to improving the training of an artificial neural network for object tracking.

SUMMARY

In one aspect of the present disclosure, a method for learning to track a target across a sequence of frames using an artificial neural network (ANN) is disclosed. The method includes extracting a target region representation from a first frame and a search region representation of a subsequent frame. The method also includes convolving the extracted target region representation with the extracted search region representation to determine a cross-correlation map. The method further includes comparing the cross-correlation map with a ground truth cross-correlation map to determine a loss value. The method still further includes back propagating the loss value into the ANN to update filter weights of the ANN.

Another aspect of the present disclosure is directed to an apparatus including means for extracting a target region representation from a first frame and a search region representation of a subsequent frame. The apparatus also includes means for convolving the extracted target region representation with the extracted search region representation to determine a cross-correlation map. The apparatus further includes means for comparing the cross-correlation map with a ground truth cross-correlation map to determine a loss value. The apparatus further includes means for back propagating the loss value into the ANN to update filter weights of the ANN.

In another aspect of the present disclosure, a non-transitory computer-readable medium with non-transitory program code recorded thereon is disclosed. The program code for learning to track a target across a sequence of frames using an ANN is executed by at least one processor and includes program code to extract a target region representation from a first frame and a search region representation of a subsequent frame. The program code also includes program code to convolve the extracted target region representation with the extracted search region representation to determine a cross-correlation map. The program code further includes program code to compare the cross-correlation map with a ground truth cross-correlation map to determine a loss value. The program code still further includes program code to back propagate the loss value into the ANN to update multiple filter weights of the ANN.

Another aspect of the present disclosure is directed to an ANN for learning to track a target across a sequence of frames. The ANN includes a representation network configured to extract a target region representation from a first frame and a search region representation of a subsequent frame. The representation network includes a fully convolutional neural network. The ANN also includes a cross-correlation layer configured to convolve the extracted target region representation with the extracted search region representation to determine a cross-correlation map. The ANN further includes a loss layer. The loss layer is configured to compare the cross-correlation map with a ground truth cross-correlation map to determine a loss value. The loss layer is also configured to back propagate the loss value into the ANN to update multiple filter weights of the ANN.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
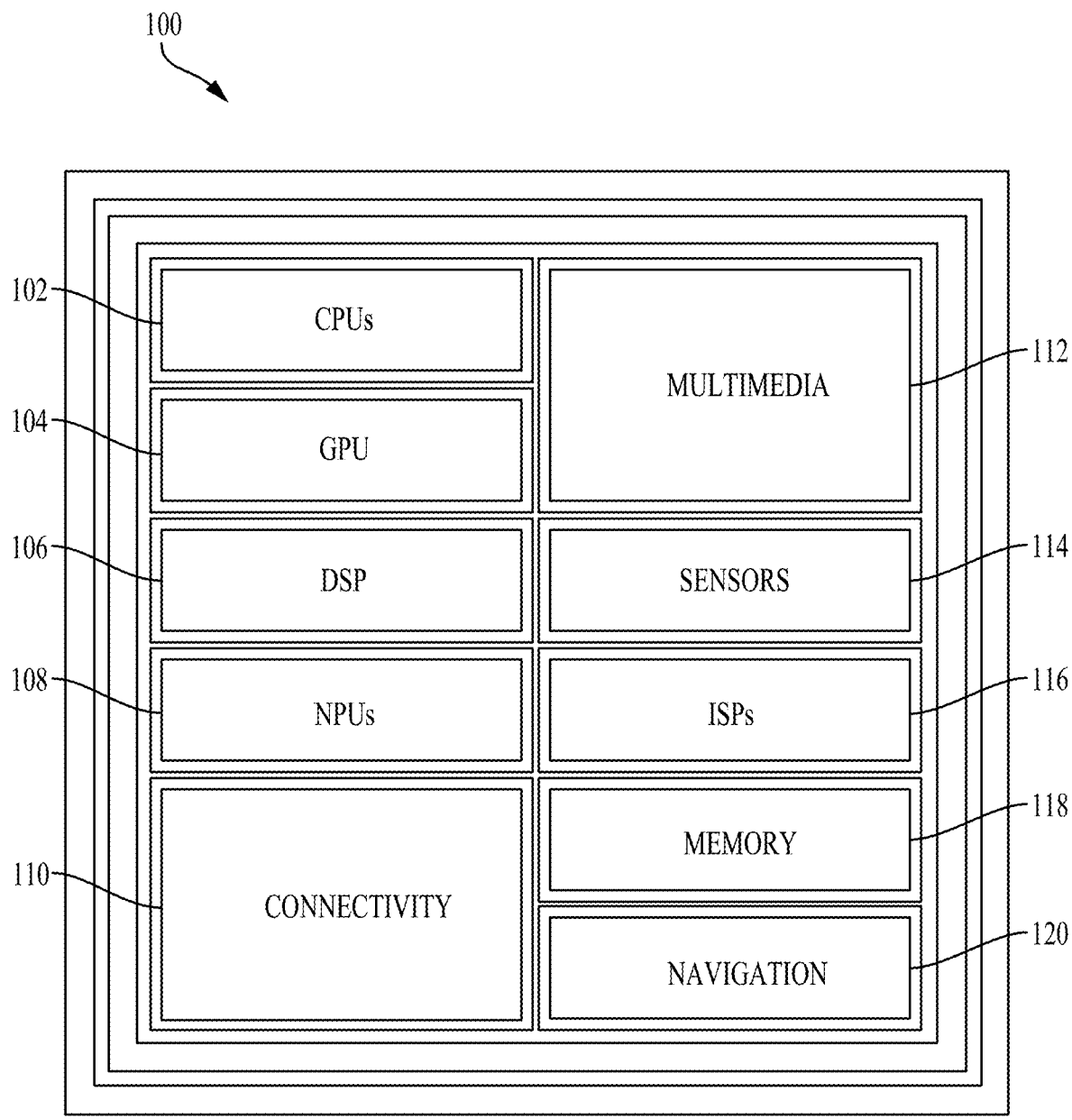
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

For object tracking, the artificial neural network (ANN) may be trained to track the object from a first frame to a search region of a subsequent frame using various techniques. That is, the artificial neural network may match an image, such as an image in a bounding box, from a first frame to a search region of a second frame (e.g., subsequent frame).

Still, the conventional training techniques may not be tailored for object tracking or may be slow. Aspects of the present disclosure are directed to improving the training of an artificial neural network by determining a loss value based on a comparison of a predicted cross-correlation map and a ground truth cross-correlation map.

FIG. 1 illustrates an example implementation of the aforementioned loss value determination using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a GPU 104, a DSP 106, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation 120, which may include a global positioning system.

The SOC may be based on an ARM instruction set. In an aspect of the present disclosure, the instructions loaded into the general-purpose processor 102 may comprise code for extracting a target region representation from a first frame and a search region representation of a subsequent frame. The general-purpose processor 102 may also comprise code for convolving the extracted target region representation with the extracted search region representation to determine a cross-correlation map. The general-purpose processor 102 may further comprise code for comparing the cross-correlation map with a ground truth cross-correlation map to determine a loss value. The general-purpose processor 102 may still further comprise code for back propagating the loss value into the artificial neural network to update a plurality of filter weights of the artificial neural network.

Figure 2:
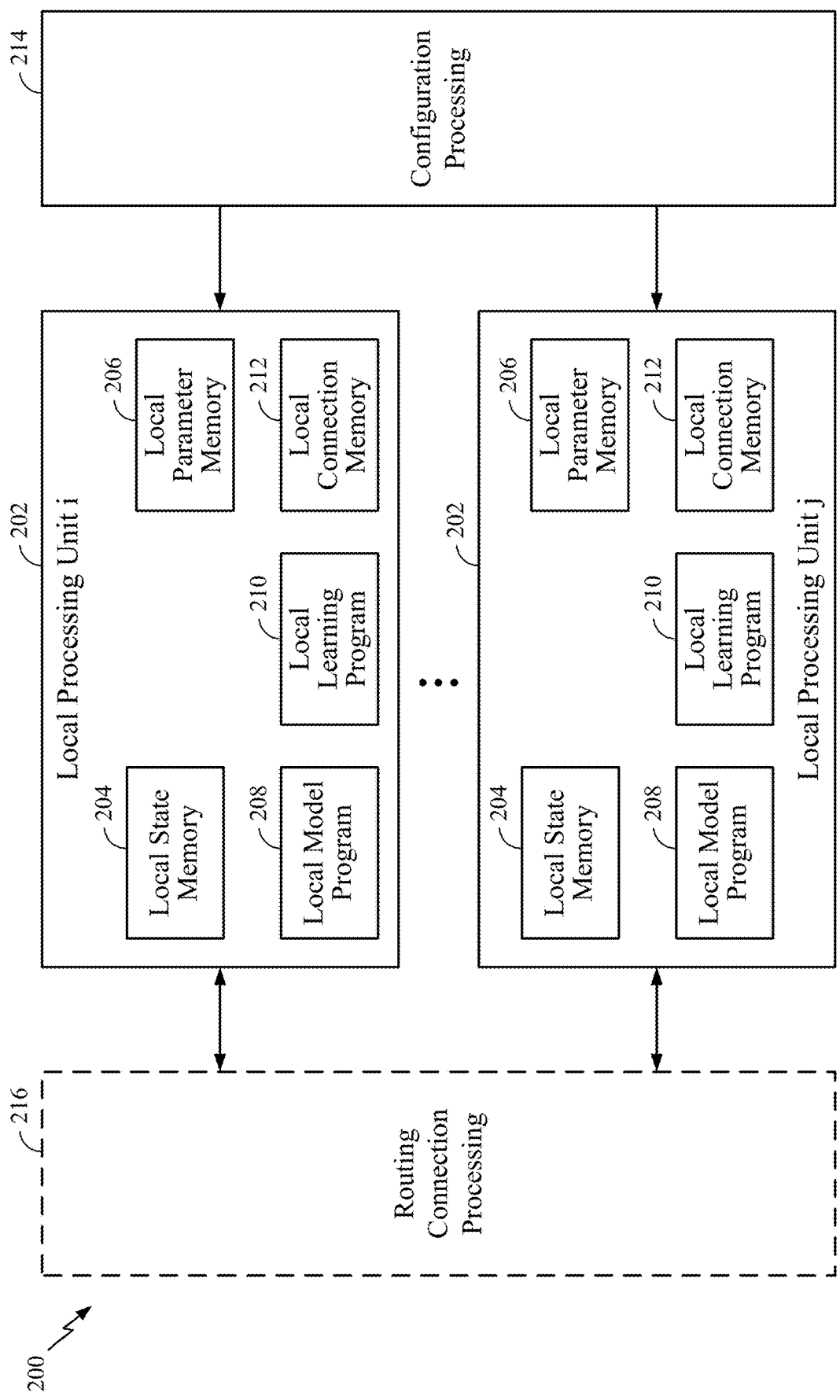
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

In one configuration, a processing model is configured for extracting a target region representation from a first frame and a search region representation of a subsequent frame, convolving the extracted target region representation with the extracted search region representation to determine a cross-correlation map, comparing the cross-correlation map with a ground truth cross-correlation map to determine a loss value, and back propagating the loss value into the artificial neural network to update a plurality of filter weights of the artificial neural network. The model includes an extracting means, convolving means, comparing means, and/or back propagating means. In one configuration, the extracting means, convolving means, comparing means, and/or back propagating means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 3A:
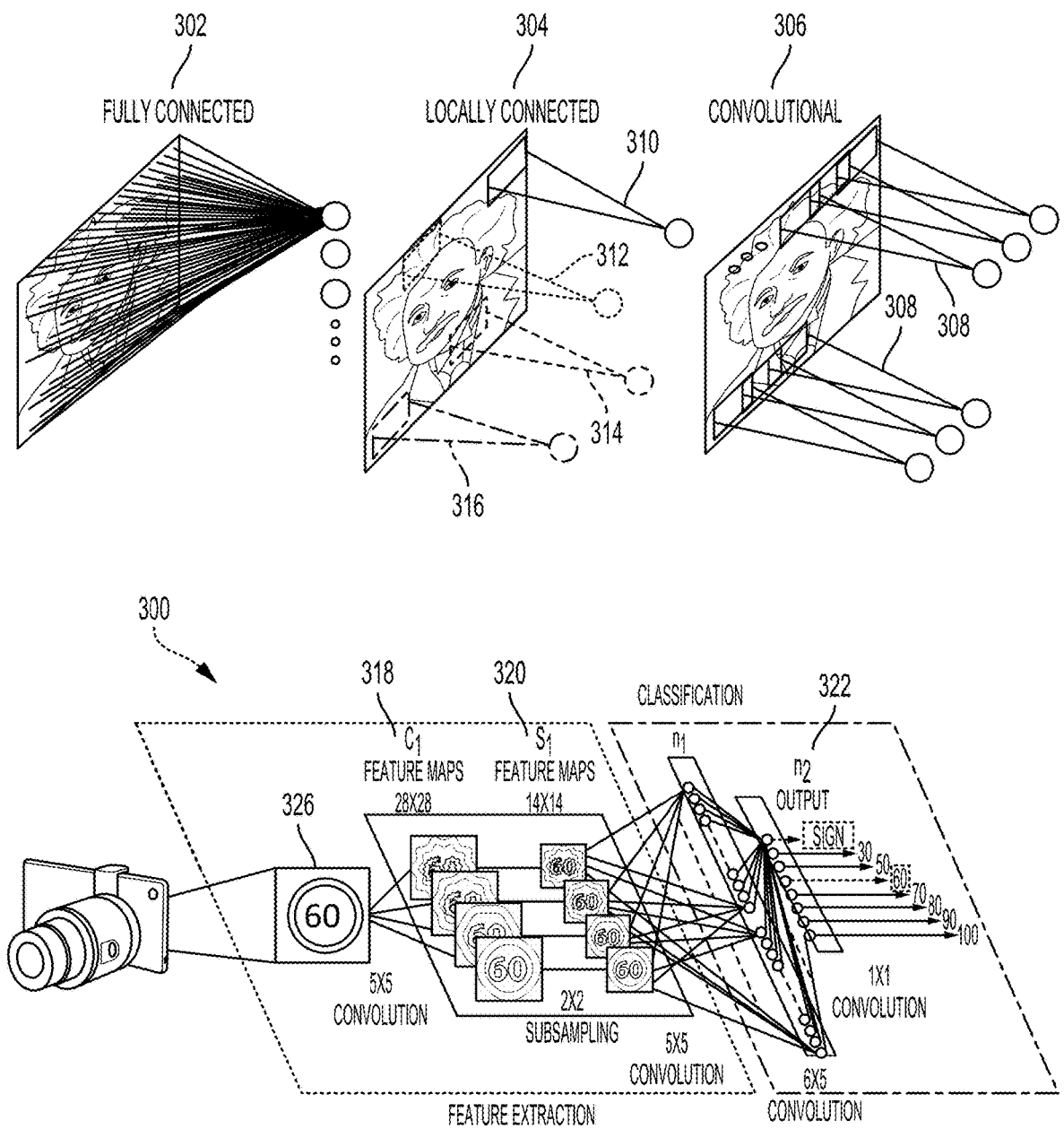
FIG. 3A is a diagram illustrating a neural network in accordance with aspects of the present disclosure.

Referring to FIG. 3A, the connections between layers of a neural network may be fully connected 302 or locally connected 304. In a fully connected network 302, a neuron in a first layer may communicate its output to every neuron in a second layer, so that each neuron in the second layer will receive input from every neuron in the first layer. Alternatively, in a locally connected network 304, a neuron in a first layer may be connected to a limited number of neurons in the second layer. A convolutional network 306 may be locally connected, and is further configured such that the connection strengths associated with the inputs for each neuron in the second layer are shared (e.g., 308). More generally, a locally connected layer of a network may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Locally connected neural networks may be well suited to problems in which the spatial location of inputs is meaningful. For instance, a network 300 designed to recognize visual features from a car-mounted camera may develop high layer neurons with different properties depending on their association with the lower versus the upper portion of the image. Neurons associated with the lower portion of the image may learn to recognize lane markings, for example, while neurons associated with the upper portion of the image may learn to recognize traffic lights, traffic signs, and the like.

A DCN may be trained with supervised learning. During training, a DCN may be presented with an image, such as a cropped image of a speed limit sign 326, and a "forward pass" may then be computed to produce an output 322. The output 322 may be a vector of values corresponding to features such as "sign," "60," and "100." The network designer may want the DCN to output a high score for some of the neurons in the output feature vector, for example the ones corresponding to "sign" and "60" as shown in the output 322 for a network 300 that has been trained. Before training, the output produced by the DCN is likely to be incorrect, and so an error may be calculated between the actual output and the target output. The weights of the DCN may then be adjusted so that the output scores of the DCN are more closely aligned with the target.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images 326 and a forward pass through the network may yield an output 322 that may be considered an inference or a prediction of the DCN.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer 318 and 320, with each element of the feature map (e.g., 320) receiving input from a range of neurons in the previous layer (e.g., 318) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

Figure 3B:
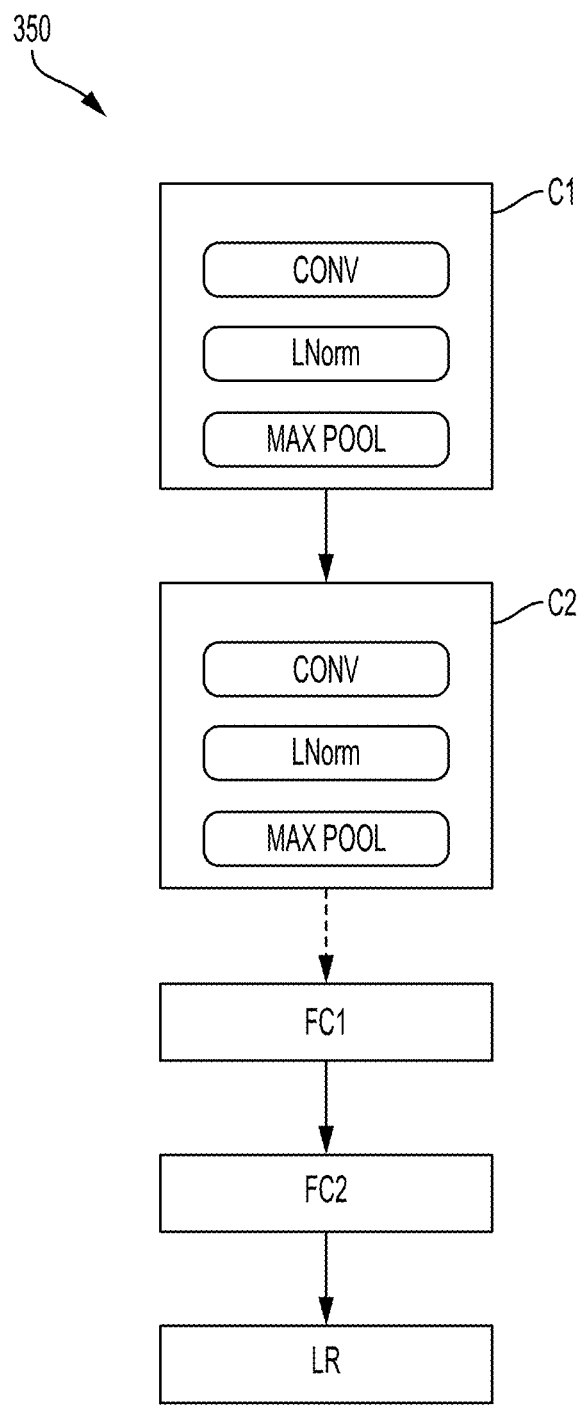
FIG. 3B is a block diagram illustrating an exemplary deep convolutional network (DCN) in accordance with aspects of the present disclosure.

FIG. 3B is a block diagram illustrating an exemplary deep convolutional network 350. The deep convolutional network 350 may include multiple different types of layers based on connectivity and weight sharing. As shown in FIG. 3B, the exemplary deep convolutional network 350 includes multiple convolution blocks (e.g., C1 and C2). Each of the convolution blocks may be configured with a convolution layer, a normalization layer (LNorm), and a pooling layer. The convolution layers may include one or more convolutional filters, which may be applied to the input data to generate a feature map. Although only two convolution blocks are shown, the present disclosure is not so limiting, and instead, any number of convolutional blocks may be included in the deep convolutional network 350 according to design preference. The normalization layer may be used to normalize the output of the convolution filters. For example, the normalization layer may provide whitening or lateral inhibition. The pooling layer may provide down sampling aggregation over space for local invariance and dimensionality reduction.

The parallel filter banks, for example, of a deep convolutional network may be loaded on a CPU 102 or GPU 104 of an SOC 100, optionally based on an ARM instruction set, to achieve high performance and low power consumption. In alternative embodiments, the parallel filter banks may be loaded on the DSP 106 or an ISP 116 of an SOC 100. In addition, the DCN may access other processing blocks that may be present on the SOC, such as processing blocks dedicated to sensors 114 and navigation 120.

The deep convolutional network 350 may also include one or more fully connected layers (e.g., FC1 and FC2). The deep convolutional network 350 may further include a logistic regression (LR) layer. Between each layer of the deep convolutional network 350 are weights (not shown) that are to be updated. The output of each layer may serve as an input of a succeeding layer in the deep convolutional network 350 to learn hierarchical feature representations from input data (e.g., images, audio, video, sensor data and/or other input data) supplied at the first convolution block C1.

Figure 4:
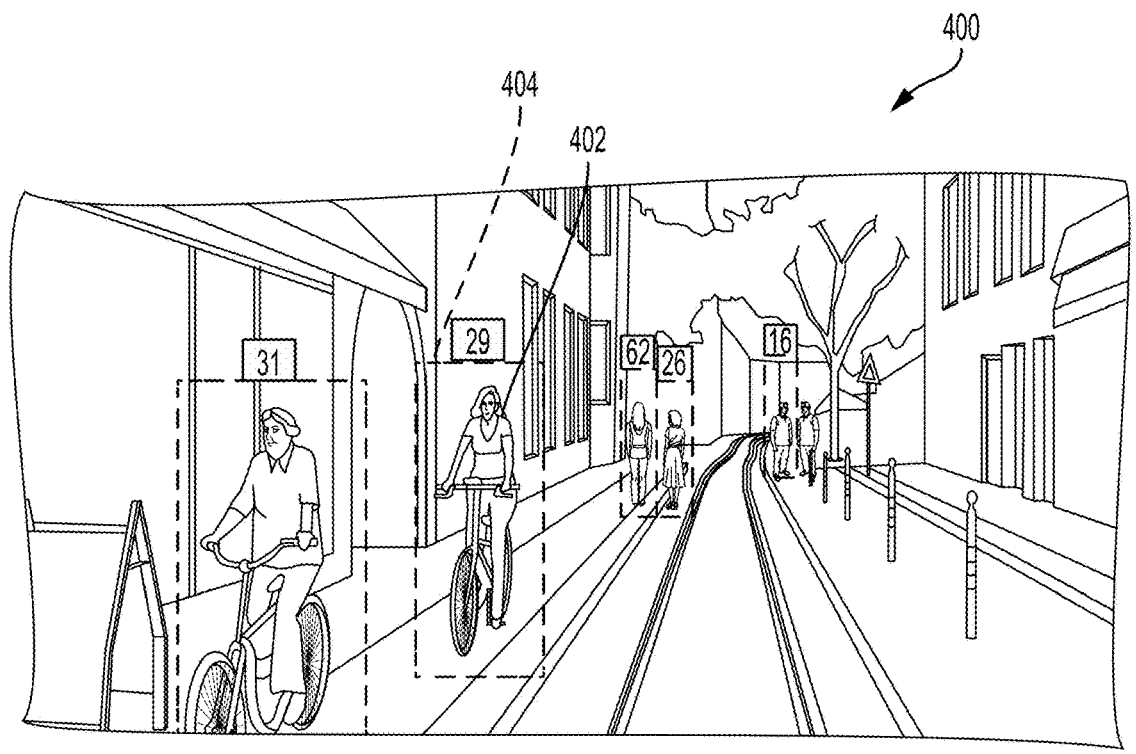
FIG. 4 illustrates an example of a frame from an object tracking system according to an aspect of the present disclosure.

FIG. 4 illustrates an example of an image 400 including objects 402 to be tracked by an object tracking system. Each object is given a unique object ID so that the object may be tracked through subsequent frames. As shown in FIG. 4, each moving object 402 may be bounded by a bounding box 404. An artificial neural network may be specified to track each object 402 in a sequence of frames, such as a video. That is, given an object's bounding box 404 in a first frame, it is desirable to predict a location of each object 402 over time (e.g., over consecutive frames). Aspects of the present disclosure are directed to improving the prediction of an object's path for tracking the motion of the moving objects.

Conventional object tracking systems may rely on extracting hand-crafted features to track an object from a first frame to a search region of a subsequent frame. That is, the tracking is performed using extracted normalized pixel values, color histograms, and local descriptors. Still, hand-crafted features do not properly describe and/or discriminate objects in the frames. Thus, an object tracking system that relies on extracted hand-crafted features may be inaccurate.

Other conventional object tracking systems apply features of an off-the-shelf network, such as a convolutional neural network (CNN). The off-the-shelf network may be trained offline and/or online as a feature extractor using conventional image databases, such as ImageNet. That is, the first frame and the second frame may be input to the feature extractor, trained from a conventional image database, to extract features of the first frame and the second frame. Furthermore, the conventional system may match the object in a bounding box of the first frame to a search region of a second frame based on the extracted features.

Still, the off-the-shelf network may have been trained for object classification. Therefore, an off-the-shelf network, trained for object (e.g., image) classification, may be too abstract or too specific for proper object tracking. To mitigate the inaccuracies of the off-the-shelf network for object tracking, different channels may be selected as the feature map. In some cases, a late convolutional layer may be selected. The late convolutional layer may be more semantic in comparison to other layers. However, the late convolutional layers may not accurately characterize object appearance. In other cases, early convolutional layers may be selected. The early convolutional layers improve the characterization of object appearance. Still, the early convolutional layers may be more sensitive to rotations and/or illuminations. Thus, regardless of the selected convolutional layers, the off-the-shelf network does not provide accurate or descriptive features for matching the image to a search region.

In another conventional system, a convolutional neural network may be trained online for object tracking. That is, the convolutional neural network may be trained online to classify (e.g., discriminate) proposal regions as either a target or a background. During the training, the network may provide a bounding box for a target. Furthermore, the user may identify random regions in proximity to the target bounding box as a background. The target bounding box may be a positive sample and the randomly selected background may be a negative sample. The convolutional neural network may be trained using positive and negative samples to predict the target in a second frame. The network may then be retrained using the prediction of the second frame and randomly selected backgrounds of the second frame. The training may continue for all of the frames of a frame sequence.

The training may be referred to as semi-supervised learning with the labels predicted by the network at each frame. All the layers, except the last fully connected layer, are shared between all videos for transfer learning. The training (e.g., fine-tuning) of a convolutional neural network may be slow. Thus, the online training may not be applicable for real-time tracking.

Figure 5:
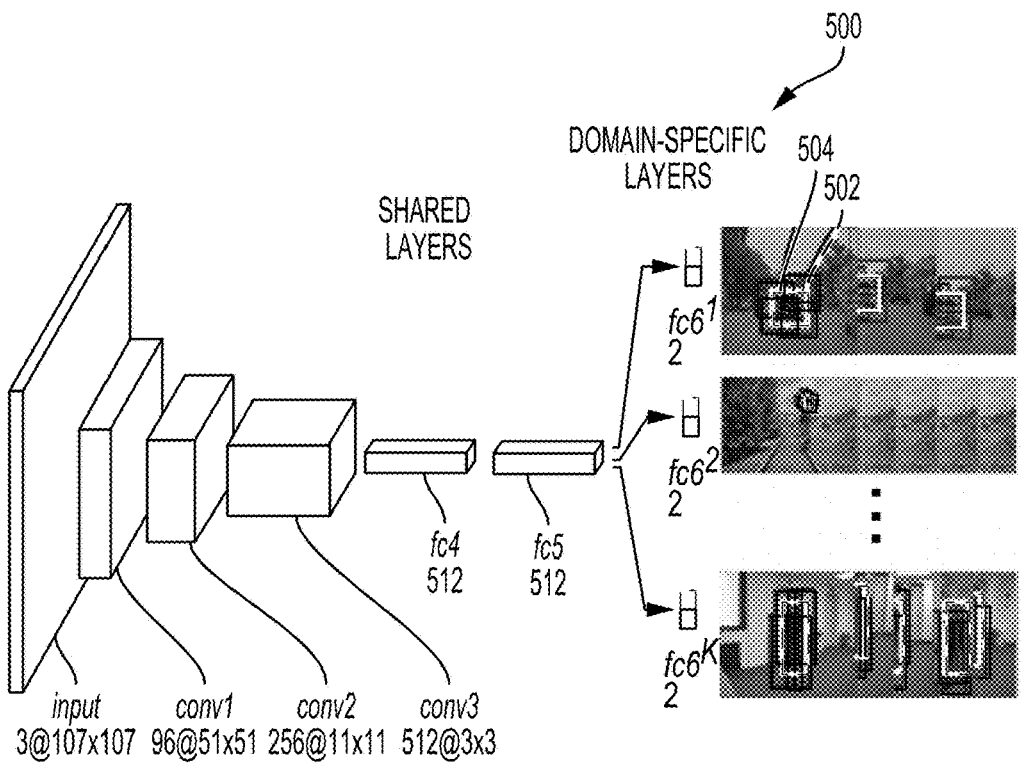
FIG. 5 illustrates an example of an online-trained convolutional neural network according to an aspect of the present disclosure.

FIG. 5 illustrates an example of a convolutional neural network 500 that is trained online. As shown in FIG. 5, an image (e.g., frame) is received at the convolutional neural network and convolved through multiple convolutional layers (conv1-conv3). As an example, the input may have three channels with a dimension of 107×107, represented as 3@107×107 in FIG. 5. The convolutional layers extract features from the input and the extracted features are input to fully connected layers (fc4-fc6). A domain-specific fully connected layer (fc6) outputs a predicted target bounding box 502. Furthermore, the user identifies random regions 504 in proximity to the target bounding box 502 as a background. The convolutional neural network may be trained using positive (e.g., predicted target) and negative samples (e.g., background) to predict the target in a second frame.

Additionally, in some conventional systems, a convolutional neural network is trained offline on a set of videos and the corresponding ground truth object bounding boxes. The videos may be obtained from standard datasets, such as ImageNet videos and/or Amsterdam Library of Ordinary Videos (ALOV). For the offline training, the network may be trained to classify proposal regions (e.g., target or background) and the network may also be trained to regress target locations.

When training a convolutional neural network to classify proposal regions, the convolutional neural network is trained to learn a binary classification function $f:(t_i, p_j) \rightarrow y_{ij} \in \{0, 1\}$ to determine whether $p_j$ is a target $t_i$ ($y_{ij}=1$) or a background ($y_{ij}=0$). That is, for the binary classification function $f$, the function is given a target region (t) from a first frame (i) and a proposal region (p) from a second frame (j). Based on the input, the function predicts a binary label that indicates whether the target and the proposal regions are a target (1) or a background (0).

To train the binary classification function, binary labels are extracted from ground truth bounding boxes by ad-hoc heuristics. The ground truth bounding boxes are obtained from a video including bounding boxes over a target. A binary label may be extracted from the ground truth bounding boxes based on a location of the proposal region to the ground truth bounding box. That is, an ad-hoc heuristic (e.g., threshold) may be set to define a binary label (e.g., target or a background) based on the relation, such as an overlap, of the ground truth bounding box to the proposal region.

For example, the binary label ($y_{ij}$) may be one if the intersection-over-union (IoU) between the target box ($t_i$) and the proposal box ($p_j$) exceeds a threshold ($y_{ij}=1$ iff IoU($t_i$, $p_j$)>threshold). In another example, the binary label ($y_{ij}$) may be zero if the intersection-over-union between the target box ($t_i$) and the proposal box ($p_j$) is less than a threshold ($y_{ij}=0$ iff IoU($t_i$, $p_j$)<threshold). The intersection-over-union may be the difference between the location of the centers of the target box ($t_i$) and the proposal box ($p_j$) (e.g., |center($t_i$)−center($p_j$)|). The threshold may be user-defined. Therefore, the threshold may not accurate. Furthermore, the threshold may result in inconsistencies and/or inaccuracies for the binary label. In the current example, the network may be trained as a two stream convolutional neural network (e.g., Siamese architecture) using a binary loss.

Figure 6:
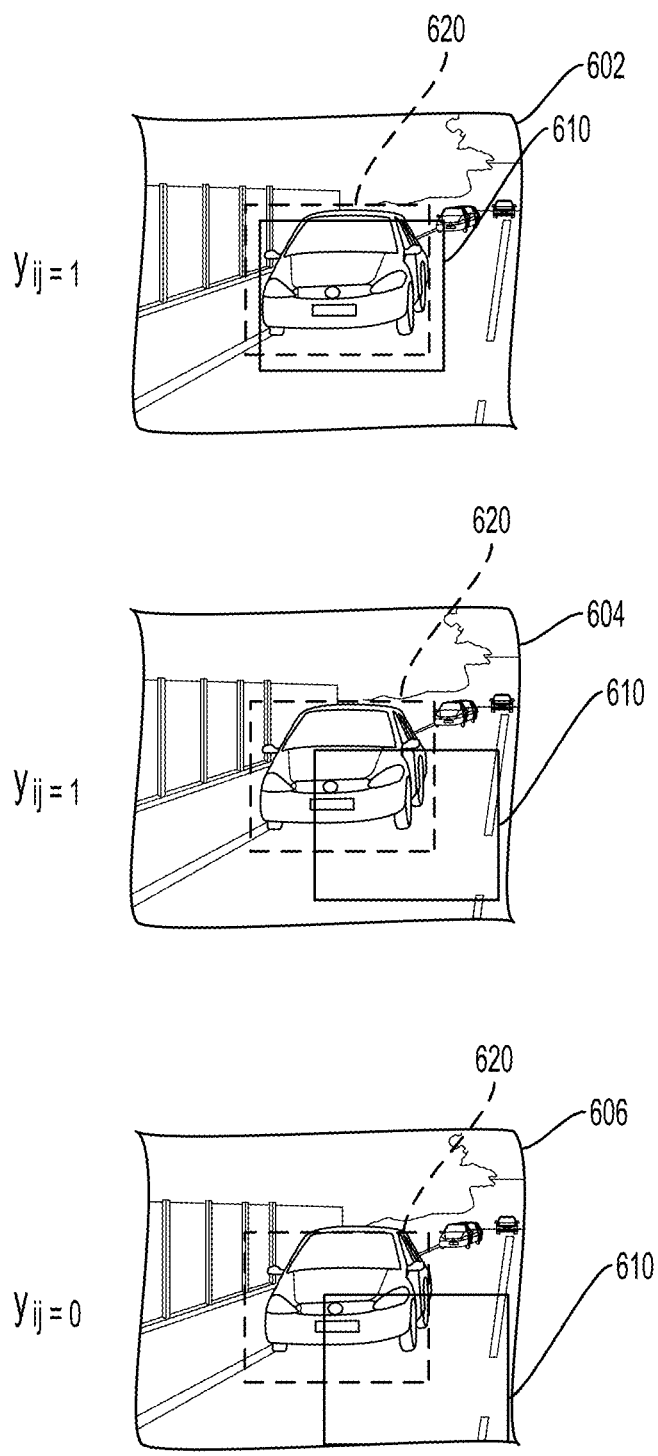
FIG. 6 illustrates examples of binary labels provided to images based on a relation to a target region and proposal region according to an aspect of the present disclosure.

As shown in FIG. 6, in a first frame 602, a proposal region 610 is substantially overlapped with the ground truth bounding box 620. Thus, for the first frame 602, the overlap satisfies the threshold and a binary label is set to one to indicate a target. For a second frame 604, only a portion of the proposal region 610 overlaps the ground truth bounding box 620. Still, for the second frame 604, the overlap satisfies the threshold. Therefore, for the second frame 604 the binary label is set to one to indicate a target. Finally, for a third frame 606, only a portion of the proposal region 610 overlaps the ground truth bounding box 620. In this example, the overlap does not satisfy the threshold. Accordingly, the binary label is set to zero to indicate a background. As shown in FIG. 6, there is a difference in the overlap of the proposal region 610 and the ground truth bounding box 620 between the first frame 602, the second frame 604, and the third frame 606.

Additionally, the difference between the overlap of the first frame 602 and the second frame 604 is substantial. Furthermore, the difference between the overlap of the third frame 606 and the second frame 604 is less than the difference between the overlap of the first frame 602 and the second frame 604. Still, as discussed above, based on the binarization, the second frame 604 is considered a positive example and the third frame 606 is considered a negative example. Thus, as shown in FIG. 6, the binarization may lead to inconsistencies for the training.

Furthermore, as discussed above, for offline training, the network is trained by regressing the target locations. That is, the network may be trained to learn a regression function $f: (t_i, p_j) \rightarrow y_{ij} \in \mathbb{R}^4$ to predict the target location. For the target function (f), the network is trained to provide a four-dimensional (4D) vector (yij ∈ $\mathbb{R}^4$) indicating the coordinates of a target box in a second frame given a target (t) in a first frame (i) and a proposal (p) in a second frame (j). Still, regressing the target coordinates directly from feature maps may increase the use of system resources. For example, the regression may use many parameters (e.g., fully connected layers) to learn the regression function.

Figure 7:
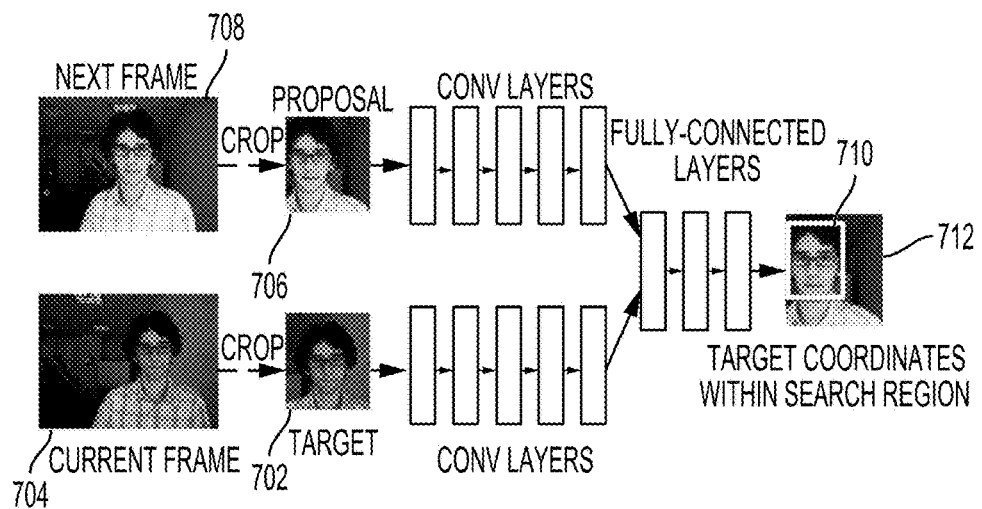
FIG. 7 illustrates an example of a network trained to provide a four-dimensional (4D) vector indicating the coordinates of a target box in a subsequent frame according to an aspect of the present disclosure.

FIG. 7 illustrates an example of a network trained to provide a four-dimensional (4D) vector (yij ∈ $\mathbb{R}^4$) indicating the coordinates of a target box in a subsequent frame, given a target (t) 702 in a first frame (i) 704 and a proposal (p) 706 in a subsequent frame (j) 708. As shown in FIG. 7, the target (t) 702 from the current frame (i) 704 and the proposal (p) 706 from the next frame (j) 708 are input to convolutional layers of a network. The convolutional layers output features of each input. Furthermore, the features of the inputs are concatenated together. The concatenated features are then fed into fully connected layers to predict the coordinates of the target based on the convolution. The network predicts target coordinates 710 within a search region 712 based on the inputs. The prediction may be based on regressing the target coordinates.

In one configuration, instead of regressing the target coordinates, the cross-correlation maps are regressed. The cross-correlation maps may be learned without a fully connected layer.

Figure 8:
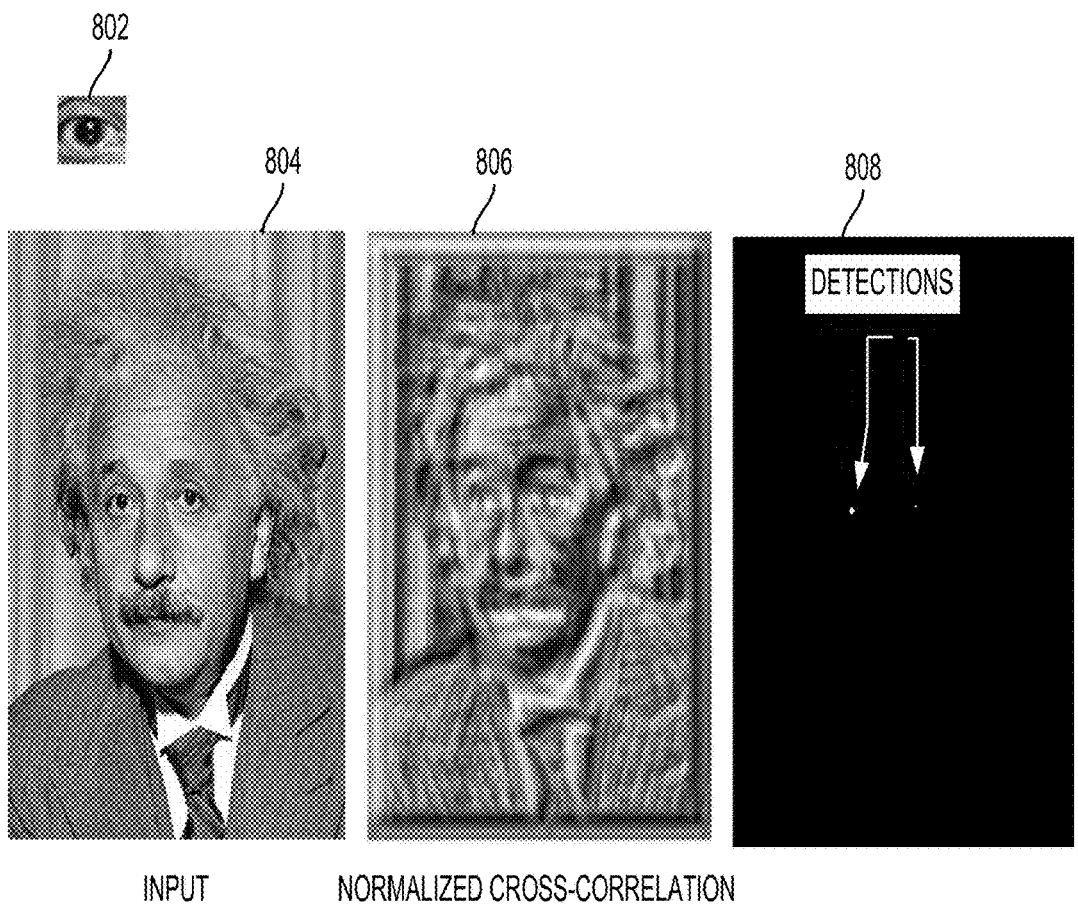
FIG. 8 illustrates an example of determining a location of a target in an input using cross-correlation according to aspects of the present disclosure.

In conventional systems, a normalized cross-correlation tracker is specified to find a target in a search region. To find the target, the cross-correlation tracker may filter a search region with the target. For example, as shown in FIG. 8, the goal of the network may be to determine the location of a target 802 in an input 804. In this example, the input 804 is convolved with the target 802 to generate a cross-correlation map 806. A maximum value from the cross-correlation map 806 is selected as a location 808 of the target 802 from the input 804. The input may be referred to as a search region. The normalized cross-correlation may be sensitive to changes in target appearance, such as a change in scale, rotation, and/or illumination.

Figure 9:
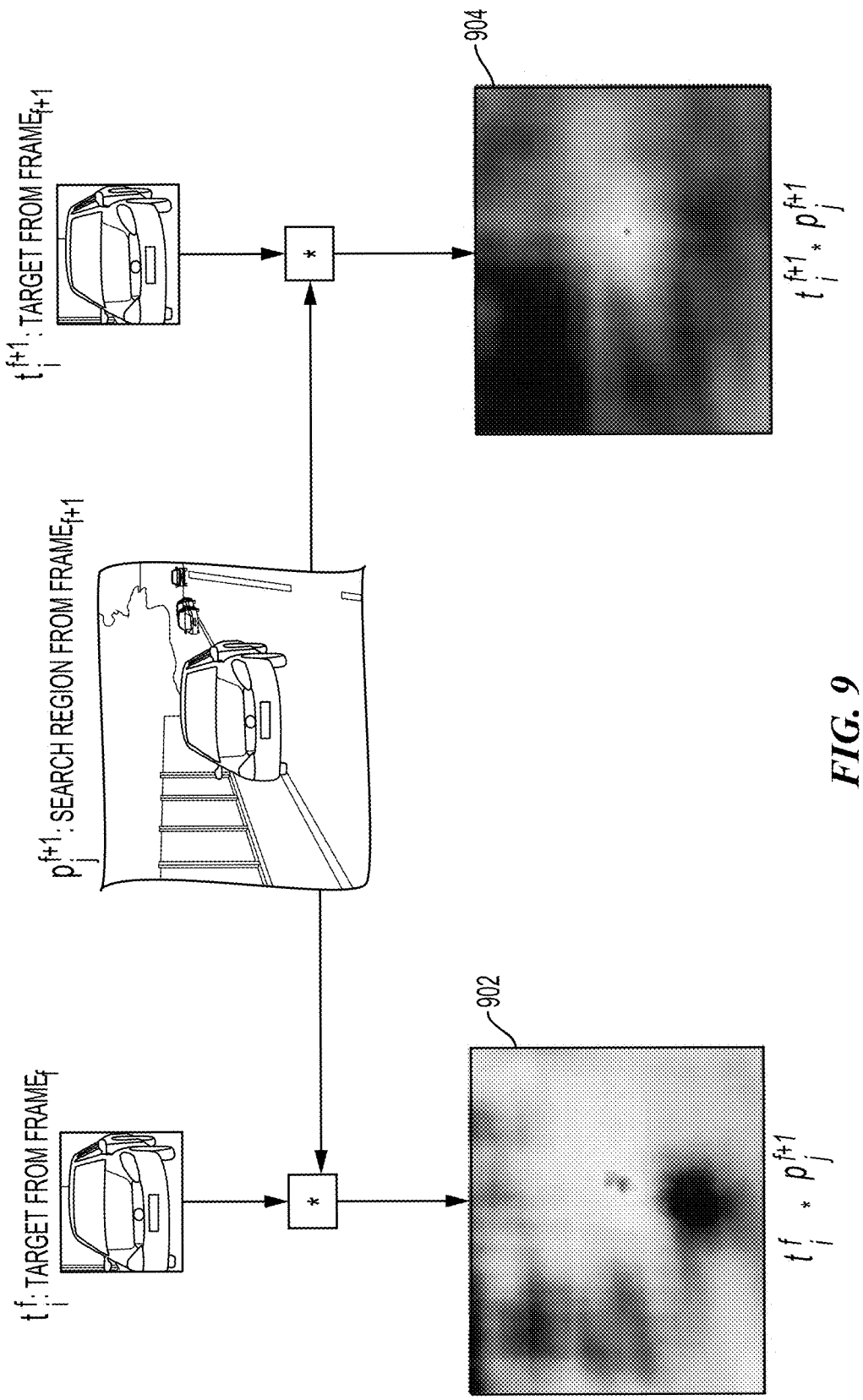
FIG. 9 illustrates examples of cross-correlation maps according to aspects of the present disclosure.

As shown in FIG. 9, a target from a first frame (f) may be convolved with a search region from a second frame (f+1) to generate a first cross-correlation map 902 (e.g., predicted cross-correlation map). The cross-correlation map may be referred to as a heat map. The maximum value of the first cross-correlation map 902 is selected as the predicted location of the target in the second frame. Additionally, an actual location (e.g., ground truth location) of a target from a second frame (f+1) may be convolved with the search region from the second frame (f+1) to generate a second cross-correlation map 904 (e.g., ground-truth cross-correlation map), used for training the network.

Due to the change in target appearance (e.g., pixel values), such as a change in scale, rotation, and/or illumination, from the first frame to the second frame, there is a variation between the first cross-correlation map 902 (e.g., prediction cross-correlation map) and the second cross-correlation map 904 (e.g., ground truth cross-correlation map). In the present example, the change in target appearance may be a result of the motion of the car from one frame to a subsequent frame. It is desirable for the cross-correlation maps to be substantially similar when there is a change in target appearance from a first frame to a second frame.

According to an aspect of the present disclosure, the network learns a representation function $\varphi_\omega$, which is invariant to changes in target appearance, such as a change in scale, rotation, and/or illumination. That is, a predicted cross-correlation map ($\varphi_\omega(t_i^f) * \varphi_\omega(p_j^{f+1})$) should be substantially similar to the ground truth cross-correlation map ($t_i^{f+1} * p_j^{f+1}$):

$$\varphi_\omega(t_i^f) * \varphi_\omega(p_j^{f+1}) \approx t_i^{f+1} * p_j^{f+1}$$

The representation function is learned by:

$$\varphi^*_\omega = \mathrm{argmin}_\omega \, \mathcal{L}(\varphi_\omega(t_i^f) * \varphi_\omega(p_j^{f+1}), t_i^{f+1} * p_j^{f+1})$$

The inputs to the network may be a target ($t_i^f$) from a first frame and a search region ($p_j^{f+1}$) of a second frame. The search region ($p_j^{f+1}$) represents an expected area of the target ($t_i^{f+1}$) in the second frame given the location of the target ($t_i^f$) in the first frame. The target ($t_i^f$) and search region ($p_j^{f+1}$) are areas cropped from each frame. The target ($t_i^f$) may be determined by an object bounding box from a ground truth. The search region ($p_j^{f+1}$) is selected based on the location of the target ($t_i^f$) from the first frame as well as areas adjacent to the target. Furthermore, the first frame (f) and the second frame (f+1) are consecutive frames. Alternatively, in one configuration, the search region ($p_j^{f+1}$) is determined by smart attention control mechanisms, such as a recurrent neural network.

In one configuration, the labels used for training are a two-dimensional (2D) map obtained by convolving $t_i^{f+1}$ and $p_j^{f+1}$, where $t_i^{f+1}$ is the target crop at a second frame extracted using ground truth bounding boxes. The label map may be resized to have the same size as the predicted cross-correlation map ($\varphi_\omega(t_i^f) * \varphi_\omega(p_j^{f+1})$).

In one configuration, the representation function ($\varphi_\omega$) is defined as a deep fully convolutional network to preserve the spatial structures in an image (e.g., frame). The convolutional layers may be obtained from known models, such as AlexNet, Inception, VGG, and/or ResNet. Additionally, in one configuration, the pooling layers are removed to obtain a high-resolution feature map. Furthermore, the network may be initialized using known models, such as ImageNet weights. Alternatively, the network initialization weights may be learned from the training data if the amount of training data is greater than a threshold (e.g., a large training data size). Representation functions for the target and search streams could be shared or separate.

According to one aspect of the present disclosure, the cross-correlation layer (*) is implemented as a convolutional layer. Additionally, in one configuration, the filter weights are obtained from the target representation. Furthermore, the loss layer ($\mathcal{L}$) may compare the predicted and ground truth cross-correlation maps. The loss function may be defined over 2D maps. The loss function may be a pixel-wise Euclidean least square errors (L2) loss function or a structured base (e.g., ranking) loss function.

Figure 10:
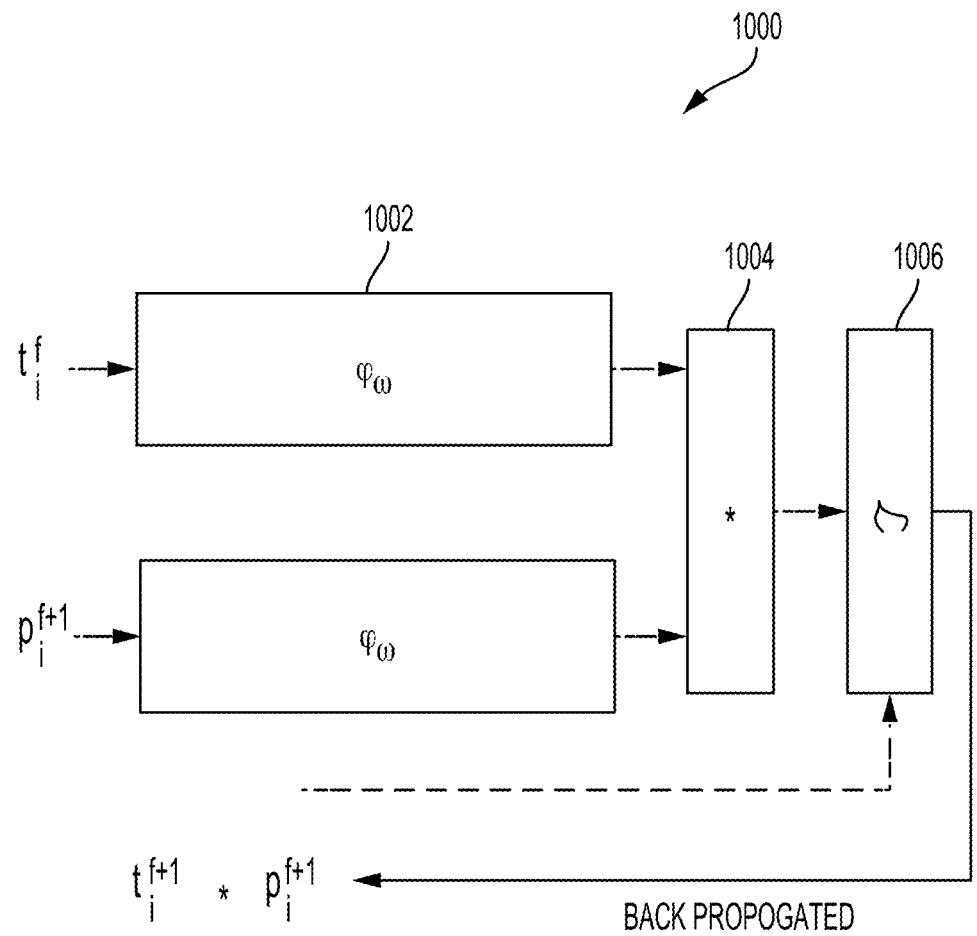
FIG. 10 illustrates an example of an artificial neural network (ANN) for learning to track a target across a sequence of frames according to aspects of the present disclosure.

FIG. 10 illustrates an example of an artificial neural network 1000 according to aspects of the present disclosure. As shown in FIG. 10, during a forward pass of the network, a target region (t) of a first frame (f) and a proposal region (p) of a second frame (f+1) are input to a representation function $\varphi_\omega$ 1002 to extract a target region representation and a search region representation. The target region (t) of a first frame (f) and a proposal region (p) of a second frame (f+1) may be cropped from the first frame (f) and the second frame (f+1), respectively. In one configuration, the representation function $\varphi_\omega$ 1002 is implemented as a representation network (e.g., fully convolutional neural network) that includes multiple representation layers.

The extracted target region representation and search region representation are input to a cross-correlation layer 1004. The cross-correlation layer 1004 convolves the extracted target region representation with the extracted search region representation to determine a cross-correlation map. The cross-correlation map is used to predict the location of a target (t) in a second frame (f+1) given the location of the target in a first frame (f+1). The cross-correlation map may be referred to as a heat map and/or a feature map. That is, the cross-correlation map may be a 2D heat map identifying the correlation of the proposal region to the target region given the representation function. The maximum value of the cross-correlation map may be used to predict the location of the target in the second frame. Aspects of the present disclosure are not limited to a 2D heat map and are contemplated for other types, such as three-dimensional (3D) heat maps.

The cross-correlation map $(\varphi_\omega(t_i^f) * \varphi_\omega(p_j^{f+1}))$ is compared to a ground truth cross-correlation map $(t_i^{f+1} * p_j^{f+1})$ (e.g., label) using a loss function implemented in a loss layer 1006. The ground truth cross-correlation map is based on the convolution of the actual location of the target (t) at the second frame (f+1) and the proposal region (p) of the second frame (f+1). The loss function identifies how well the predicted cross-correlation map compares to the ground truth (e.g., actual) cross-correlation map. The result of the loss function is a loss value that is back propagated, during a backward pass, to train the representation function $\varphi_\omega$ (e.g., $\varphi^*_\omega = \text{argmin}_\omega \mathcal{L}(\varphi_\omega(t_i^f) * \varphi_\omega(p_j^{f+1}), t_i^{f+1} * p_j^{f+1}))$.

During training, the cross-correlation layer is learned by back propagation. Similar to convolutional layers, the gradients of the cross-correlation layer are calculated with respect to the filter weights and to the input feature maps. The gradients with respect to the filter weights are back propagated through the extracted target region representation. The gradients with respect to the input feature maps are back propagated through the extracted search region representation.

The training may be performed offline. Furthermore, after training, the trained network may be implemented for online use to determine search regions for a second frame given the location of a target in a first frame. The online (e.g., live) network may not implement the loss function layer ($\mathcal{L}$) 1006 of FIG. 10. As an example, at a first frame one, the location of a target (e.g., target region) is known. Furthermore, based on the target region in the first frame, a proposal region is obtained. The proposal region is a prediction for the location of the target in a second frame based on the location of the target region of the first frame. For example, the proposal region is the location of the target at the first frame (e.g., the bounding box) and adjacent regions. The target region and proposal region are input to the trained representation function $\varphi_\omega$ to obtain a cross-correlation map that identifies a location of the target within the proposal region. That is, the maximum value of the cross-correlation map identifies the target region in the second frame. Given the target region in the second frame, a proposal region for the third frame is obtained. Additionally, the target region of the second frame and the proposal region of the third frame are input to the network to obtain the target region of the third frame. The process continues for all of the frames in the sequence of frames to track the target through the consecutive frames.

Figure 11:
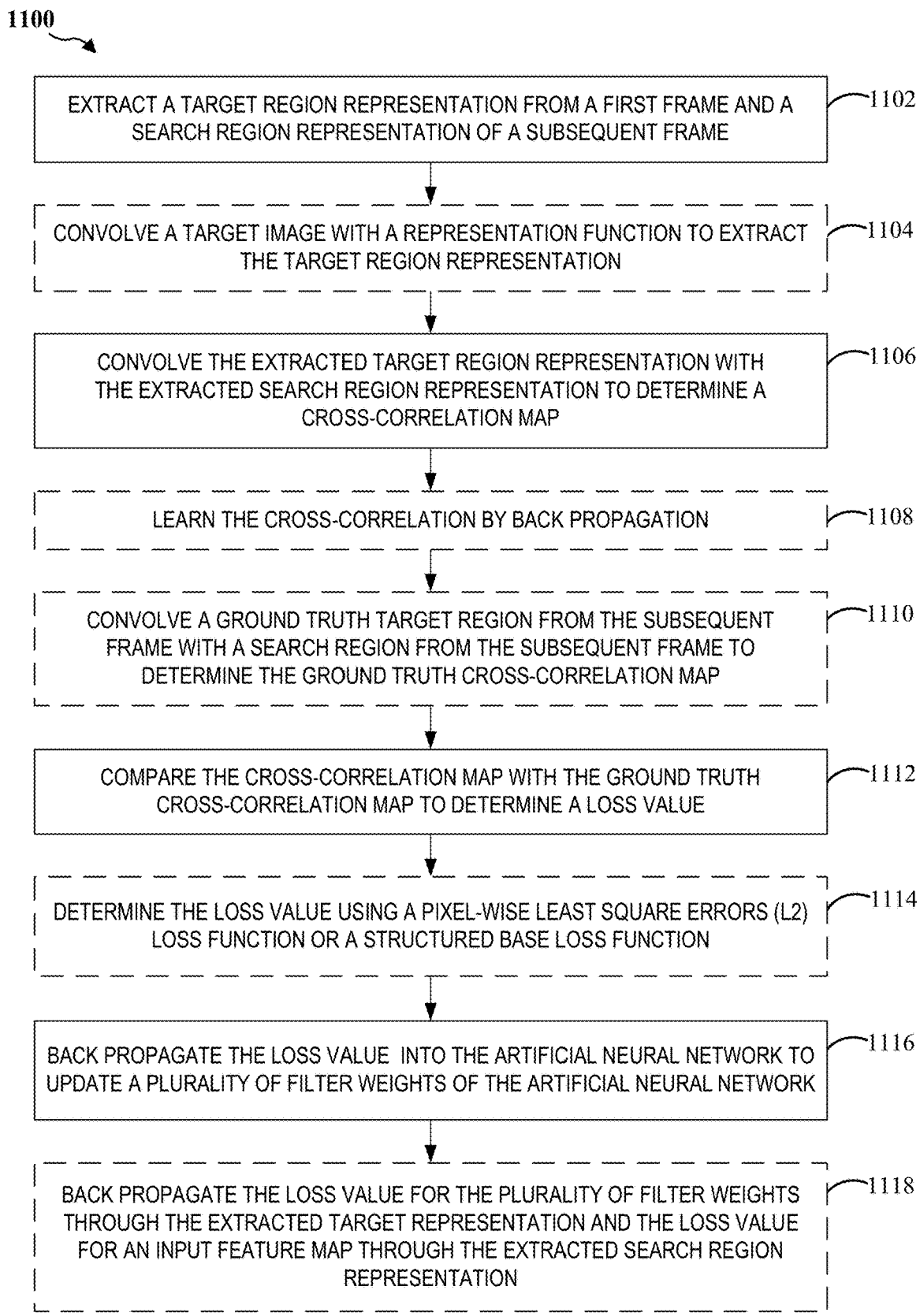
FIG. 11 illustrates a flow diagram for a method of learning to track a target across a sequence of frames according to aspects of the present disclosure.

FIG. 11 illustrates a method 1100 for learning to track a target across a sequence of frames using an artificial neural network according to an aspect of the present disclosure. At block 1102, the artificial neural network extracts a target region representation from a first frame and a search region representation of a subsequent frame. The target region representation may be extracted from a target image cropped from the first frame. Furthermore, the search region representation may be extracted from a search region cropped from the subsequent frame. The target region representation and search region representation may be extracted by a representation network (e.g., fully convolutional neural network) that includes multiple representation layers. That is, in an optional configuration, in block 1104 the target image is convolved with a representation function to extract the target region representation.

In block 1106, the artificial neural network convolves the extracted target region representation with the extracted search region representation to determine a cross-correlation map. The cross-correlation map is used to predict the location of a target (t) in a second frame (f+1) given the location of the target in a first frame (f+1). The cross-correlation map may be referred to as a heat map and/or a feature map. That is, the cross-correlation map may be a 2D heat map identifying the correlation of the proposal region to the target region given the representation function. The maximum value of the cross-correlation map may be used to predict the location of the target in the second frame. The convolution may be performed at a cross-correlation layer. In an optional configuration, in block 1108, the cross-correlation layer is learned by back propagation.

Furthermore, in an optional configuration, in block 1110, the artificial neural network convolves a ground truth target region from the subsequent frame with a search region from the subsequent frame to determine the ground truth cross-correlation map. Additionally, in block 1112, the artificial neural network compares the cross-correlation map with the ground truth cross-correlation map to determine a loss value. The comparison may be performed using a loss function implemented in a loss layer. In an optional configuration, in block 1114, the loss value is determined using a pixel-wise least square errors (L2) loss function or a structured base loss function. The loss function identifies how well the predicted cross-correlation map compares to the ground truth (e.g., actual) cross-correlation map. The result of the loss function is a loss value.

In block 1116, the loss value is back propagated into the artificial neural network to update filter weights of the artificial neural network. That is, the loss value is back propagated, during a backward pass, to train the representation function $(\varphi_\omega)$ (e.g., $\varphi^*_\omega = \text{argmin}_\omega \mathcal{L}(\varphi_\omega(t_i^f) * \varphi_\omega(p_j^{f+1}), t_i^{f+1} * p_j^{f+1}))$. During training, the cross-correlation layer is learned by back propagation. Similar to convolutional layers, the gradients of the cross-correlation layer are calculated with respect to the filter weights and to the input feature maps. The gradients with respect to the filter weights are back propagated through the extracted target region representation. The gradients with respect to the input feature maps are back propagated through the extracted search region representation. Thus, in an optional configuration, in block 1118, the loss value for the filter weights is back propagated through the extracted target region representation and the loss value for an input feature map is back propagated through the extracted search region representation.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus.

The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An artificial neural network (ANN) of a computing device, the ANN comprising:
    a representation network configured to:
        receive a target object image of a target object extracted from a first frame of a sequence of frames, the target object being an object that is to be located in a second frame of the sequence of frames;
        receive a search region image of a search region extracted from the second frame of the sequence of frames, the search region corresponding to an expected location of the target object in the second frame of the sequence of frames based on a location of the target object in the first frame, the first frame and the second frame being consecutive frames in the sequence of frames, the first frame and the second frame corresponding to different images, and a size of the search region image being greater than a size of the target object image; and
        extract a target region feature map of the target object image and a search region feature map of the search region image;
    a cross-correlation layer configured to:
        receive the extracted target region feature map and the extracted search region feature map; and
        convolve the extracted target region feature map with the extracted search region feature map to determine a cross-correlation map;
    a predicting layer configured to:
        receive the cross-correlation map; and
        predict coordinates of the target object in the second frame based on the cross-correlation map; and
    a loss layer configured to:
        compare the cross-correlation map with a ground truth cross-correlation map to determine a loss value, the ground truth cross-correlation map based on a ground truth target feature map of the target object from the second frame; and
        back propagate the loss value into the ANN to update a plurality of filter weights of a representation function.

2. The ANN of claim 1, in which the cross-correlation layer is further configured to convolve the ground truth target feature map with the search region feature map to determine the ground truth cross-correlation map.

3. The ANN of claim 1, in which the loss layer comprises a pixel-wise least square errors (L2) loss function or a structured base loss function.

4. The ANN of claim 1, in which the cross-correlation layer is further configured to determine the cross-correlation map during a forward pass of the ANN.

5. The ANN of claim 1, in which, during a backward pass, the loss value for the plurality of filter weights is back propagated through the extracted target region feature map and the loss value for an input feature map is back propagated through the extracted search region feature map.

6. The ANN of claim 1, in which the cross-correlation layer is learned by back propagating the loss value.

7. The ANN of claim 1, in which the ground truth cross-correlation map comprises a label.

8. The ANN of claim 1, in which the representation network is further configured to convolve the target object image with the representation function to extract the target region feature map, the representation function configured to preserve a spatial structure of the target image.

9. A method for tracking a target object via an artificial neural network (ANN), comprising:
receiving a target object image of the target object extracted from a first frame of a sequence of frames, the target object being an object that is to be located in a second frame of the sequence of frames;
receiving a search region image of a search region extracted from the second frame of the sequence of frames, the search region corresponding to an expected location of the target object in the second frame of the sequence of frames based on a location of the target object in the first frame, the first frame and the second frame being consecutive frames in the sequence of frames, the first frame and the second frame corresponding to different images, and a size of the search region image being greater than a size of the target object image;
extracting a target region feature map of the target object image and a search region feature map of the search region image;
receiving the extracted target region feature map and the extracted search region feature map;
convolving the extracted target region feature map with the extracted search region feature map to determine a cross-correlation map;
predicting coordinates of the target object in the second frame based on the cross-correlation map;
comparing the cross-correlation map with a ground truth cross-correlation map to determine a loss value, the ground truth cross-correlation map based on a ground truth target feature map of the target object from the second frame; and
back propagating the loss value into an artificial neural network to update a plurality of filter weights of a representation function.

10. The method of claim 9, further comprising convolving the ground truth target feature map frame with the search region feature map to determine the ground truth cross-correlation map.

11. The method of claim 9, further comprising determining the loss value using a pixel-wise least square errors (L2) loss function or a structured base loss function.

12. The method of claim 9, further comprising determining the cross-correlation map during a forward pass of the ANN.

13. The method of claim 9, further comprising back propagating, during a backward pass:
the loss value for the plurality of filter weights through the extracted target region feature map, and
the loss value for an input feature map through the extracted search region feature map.

14. The method of claim 9, further comprising learning a cross-correlation layer by back propagating the loss value.

15. The method of claim 9, in which the ground truth cross-correlation map comprises a label.

16. The method of claim 9, further comprising convolving the target object with the representation function to extract the target region feature map, the representation function configured to preserve a spatial structure of the target image.

17. An apparatus, comprising:
means for receiving a target object image of a target object extracted from a first frame of a sequence of frames, the target object being an object that is to be located in a second frame of the sequence of frames;
means for receiving a search region image of a search region extracted from the second frame of the sequence of frames, the search region corresponding to an expected location of the target object in the second frame of the sequence of frames based on a location of the target object in the first frame, the first frame and the second frame being consecutive frames in the sequence of frames, the first frame and the second frame corresponding to different images, and a size of the search region image being greater than a size of the target object image;
means for extracting a target region feature map of the target object image and a search region feature map of the search region image;
means for receiving the extracted target region feature map and the extracted search region feature map;
means for convolving the extracted target region feature map with the extracted search region feature map to determine a cross-correlation map;
means for predicting coordinates of the target object in the second frame based on the cross-correlation map;
means for comparing the cross-correlation map with a ground truth cross-correlation map to determine a loss value, the ground truth cross-correlation map based on a ground truth target feature map of the target object from the second frame; and
means for back propagating the loss value into an artificial neural network to update a plurality of filter weights of a representation function.

18. The apparatus of claim 17, further comprising means for convolving the ground truth target feature map with the extracted search region feature map to determine the ground truth cross-correlation map.

19. The apparatus of claim 17, further comprising means for back propagating, during a backward pass:
the loss value for the plurality of filter weights through the extracted target region feature map, and
the loss value for an input feature map through the extracted search region feature map.

20. A non-transitory computer-readable medium having program code recorded thereon, the program code being executed by a processor of a neural computing device and comprising:
program code to receive a target object image of a target object extracted from a first frame of a sequence of frames, the target object being an object that is to be located in a second frame of the sequence of frames;
program code to receive a search region image of a search region extracted from the second frame of the sequence of frames, the search region corresponding to an expected location of the target object in the second frame of the sequence of frames based on a location of the target object in the first frame, the first frame and the second frame being consecutive frames in the sequence of frames, the first frame and the second frame corresponding to different images, and a size of the search region image being greater than a size of the target object image;

program code to extract a target region feature map of the target object image and a search region feature map of the search region image;

program code to receive the extracted target region feature map and the extracted search region feature map;

program code to convolve the extracted target region feature map with the extracted search region feature map to determine a cross-correlation map;

program code to predict coordinates of the target object in the second frame based on the cross-correlation map;

program code to compare the cross-correlation map with a ground truth cross-correlation map to determine a loss value, the ground truth cross-correlation map based on a ground truth target feature map of the target object from the second frame; and program code to back propagate the loss value into an artificial neural network to update a plurality of filter weights of a representation function.

* * * * *